(No Model.)

W. CUMMINGS.
TOKEN ADVERTISING DEVICE.

No. 523,269. Patented July 17, 1894.

WITNESSES
H. A. Lamb
Susie V. Richardson

INVENTOR
Willie Cummings
By A. M. Wooster
Atty.

UNITED STATES PATENT OFFICE.

WILLIS CUMMINGS, OF BRIDGEPORT, CONNECTICUT.

TOKEN ADVERTISING DEVICE.

SPECIFICATION forming part of Letters Patent No. 523,269, dated July 17, 1894.

Application filed December 4, 1893. Serial No. 492,709. (No model.)

*To all whom it may concern:*

Be it known that I, WILLIS CUMMINGS, a citizen of the United States, residing at Bridgeport, in the county of Fairfield and State of Connecticut, have invented certain new and useful Improvements in Token Advertising Devices; and I do hereby declare the following to be a full, clear and exact description of the invention, such as will enable others skilled in the art to which it appertains to make and use the same.

My invention has for its object the production of an advertising device which shall be adapted for general use wherever it is desired to attract the attention of the public and to cause visitors to repeat their visits.

With this end in view I have devised the novel token operated advertising device which I will now describe referring by numbers to the accompanying drawings forming part of this specification, in which—

Figure 1:
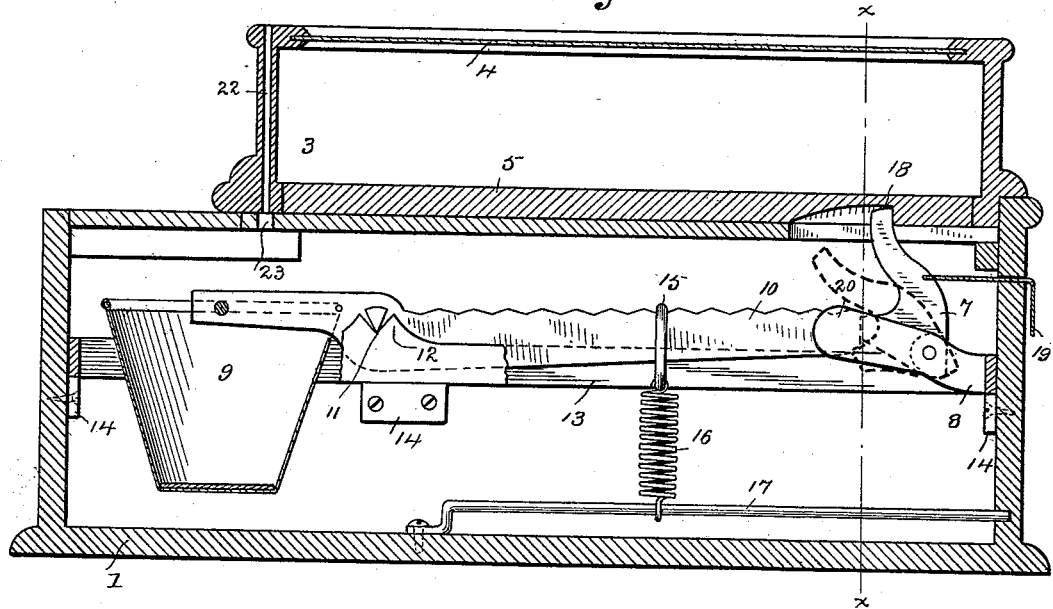
Figure 2:
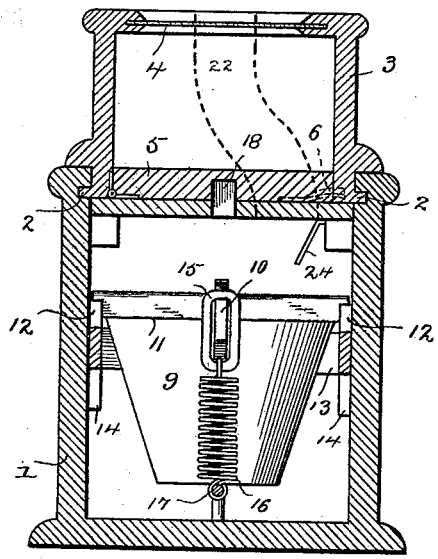

Figure 1 is a central longitudinal section of the case or box, most of the operating mechanism being in elevation. Fig. 2 is a section on the line $x\,x$ in Fig. 1, and Fig. 3 is a similar section illustrating certain obvious changes in the details of construction.

1 denotes the case which is ordinarily made of wood and is provided on its top with ways 2 in which box 3 slides. This box is preferably provided with a rigidly secured glass top indicated by 4 and with a bottom 5 which may be hinged and is shown as secured in place by a suitable catch as at 6. This box is intended to hold a sum of money or other present to be given to the party who shall succeed in opening the box, it being of course impossible to remove the present from the box until the box itself is removed from the case. The box is locked in position by a suitable dog 7 which I have shown as a bell crank lever in shape and as pivoted to a bracket 8 within the case.

9 is a receptacle for tokens which may be made of metal or may be a textile or leather bag as preferred. This receptacle is pivoted at the end of a lever 10, said lever being provided with knife edges 11 which engage bearings 12 on a frame 13 which preferably extends entirely around the inner side of the case and rests upon cleats 14. It will of course be understood that the special construction of this frame is not of the essence of my invention. I preferably however, for the sake of strength and cheapness, make it substantially as shown in the drawings. The upper edge of the lever is slightly serrated as shown and carries a loop 15 to which a spring 16 is connected, the lower end of said spring being suitably connected to the case for example to a rod 17 as shown in the drawings which permits the spring to be readily adjusted toward or from the bearings of the lever. In the under side of the box is a locking notch 18 which is engaged by a dog 7 the dog being drawn to locking position, after the box has been slid to place upon the top of the case, by means of a string 19. After having locked the box the string may be pushed back into it or cut off. This will make no difference however, with the operation of the device as the instant the dog is drawn to locking position, as in Figs. 1 and 3, the spring will draw down the long arm of lever 10 and cause it to abut against a projecting portion of the dog as is clearly shown, thereby rigidly securing the dog in the locking position and rendering it impossible to manipulate the dog from the outside of the case by means of the string or in any other manner. In the form illustrated in Fig. 3 the construction is practically the same the only difference being that the dog is retained in the locking position by engagement with the side of lever 10 instead of with the end thereof as in Fig. 1.

Figure 3:
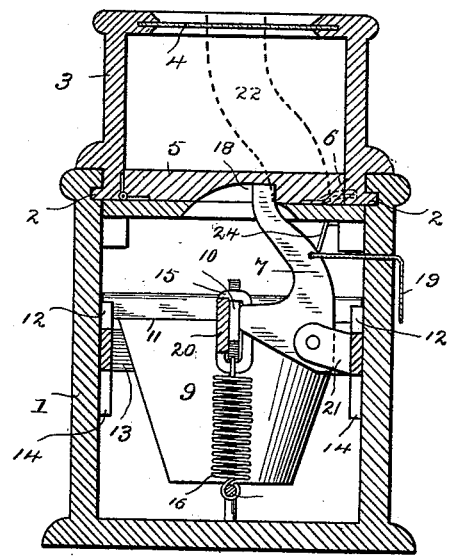

In order that the same frames may be used in both forms if so desired I provide bracket 8 with a forwardly extending arm 20 against which the lever rests as in Fig. 3. This arm is made strong and rigid and prevents the lever from being forced sidewise by any pressure that can possibly be applied to the locking arm. The bracket to which the locking lever is pivoted in Fig. 3 is indicated by 21.

22 denotes a slot in the end of the box which is preferably curved as indicated by dotted lines in Figs. 2 and 3 and which registers with a slot 23 in the top of the case.

The operation is as follows: Suppose for example that the device is used in a store, each purchaser is given a token which may be a disk of metal or other material suitably inscribed to indicate its use, having received a token or a number of them the purchaser may whenever he chooses drop the tokens into the slot and allow them to pass down into the receptacle. When sufficient tokens shall have been dropped into the receptacle so that their aggregate weight will overcome the strength of the spring the short arm of the lever will be moved downward by the weight of the tokens which will tilt the long arm of the lever upward and thereby release the locking dog. The locking dog when released will drop to the unlocking position, as indicated by dotted lines in Fig. 1, by gravity so that the successful person may remove the box from the case and by opening the box by means of the hinged bottom may remove the present therefrom. It is of course obvious that the element of chance enters largely into the operation of this device as it is practically impossible to tell the exact number of tokens whose aggregate weight will overcome the strength of the spring at any special adjustment. A slight movement of the spring in either direction will change the leverage and consequently change the weight required to overcome it. Furthermore it is not contemplated that purchasers will all choose to drop their tokens into the receptacle at the time they receive them, purchasers having the option of keeping the tokens as long as they choose and allowing a number to accumulate which they can put into the receptacle at one time, it being understood of course that the present belongs to the party who finally succeeds in opening the box.

24 is a guide placed at the lower end of the slot against which the tokens strike as they pass down the slot and by which they are turned into the receptacle so that none of them will drop outside. By curving the slot as shown and providing the guard it is rendered practically impossible to tamper with the receptacle from the outer side.

Having thus described my invention, I claim—

An advertising device of the class described consisting essentially of a case, a removable box adapted to be locked in position by a suitable dog within the case, a lever adapted to engage said dog to retain it in the locking position, a spring acting to hold the lever in the engaging position and a receptacle at the other end of said lever adapted to receive tokens and hold them until their aggregate weight shall overcome the power of the spring and release the locking dog thereby permitting the box to be removed.

In testimony whereof I affix my signature in presence of two witnesses.

WILLIS CUMMINGS.

Witnesses:
A. M. WOOSTER,
SUSIE V. RICHARDSON.